Sept. 10, 1940. J. LANGERMAN Re. 21,559
TABLET AND SUPPOSITORY PRESS
Original Filed June 23, 1938
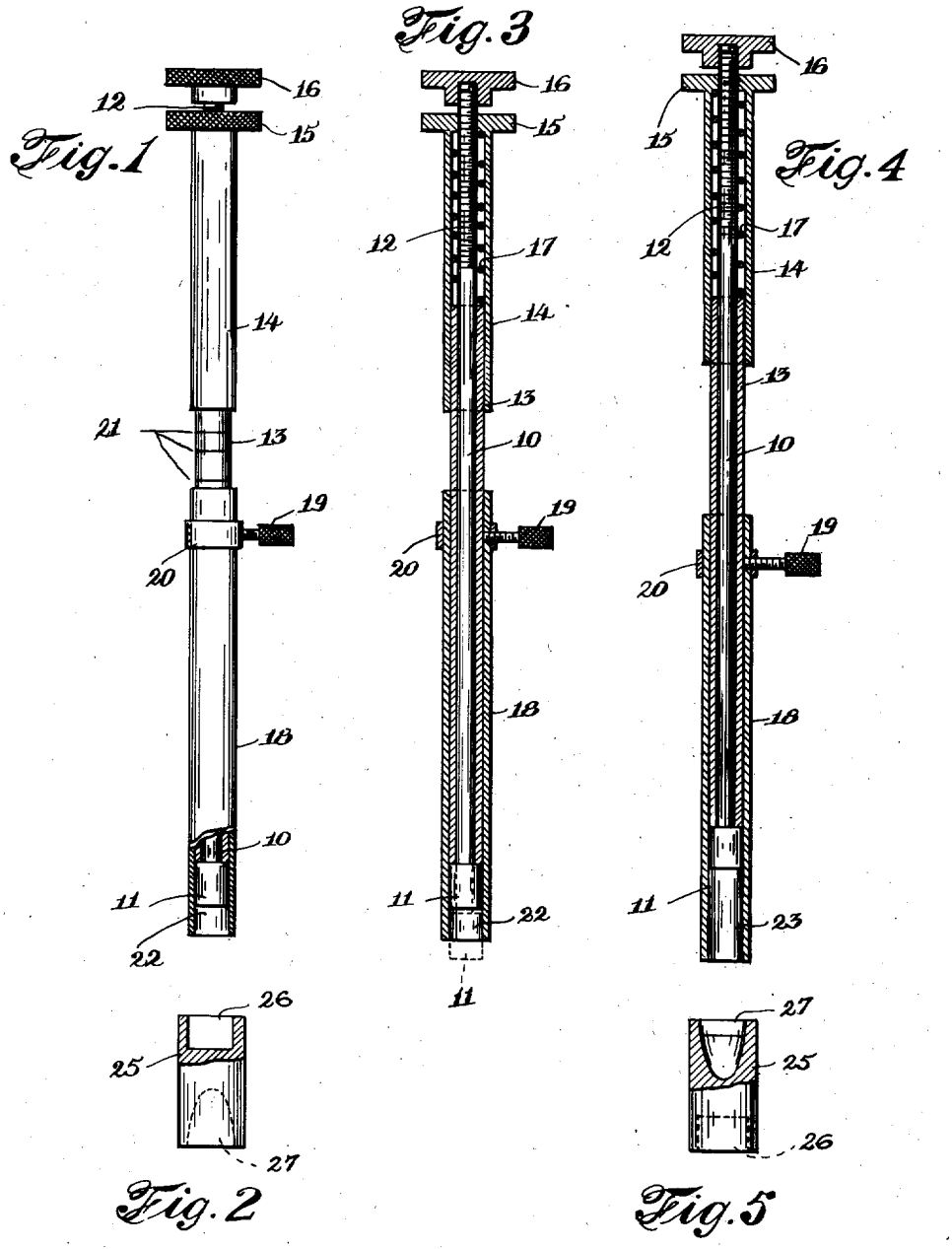
JONAS LANGERMAN
INVENTOR
BY Alexander Meicher
ATTORNEY Reissued Sept. 10, 1940

Re. 21,559

UNITED STATES PATENT OFFICE 21,559

TABLET AND SUPPOSITORY PRESS

Jonas Langerman, New York, N. Y., assignor of one-half to Sol Gaswirth, Brooklyn, N. Y.

Original No. 2,149,739, dated March 7, 1939, Serial No. 215,432, June 23, 1938. Application for reissue November 17, 1939, Serial No. 305,889

6 Claims. (Cl. 107—18)

This invention relates generally to a press for forming tablets, lozenges and suppositories, but more specifically to a press wherein the sizes of the tablets, lozenges and suppositories are made variable without the use of extra parts and wherein the same parts of the press also serve as an adjustable measuring cup for dispensing or packaging of pharmaceutical powders.

The main object of the invention resides in the provision of a press wherein the same parts are adaptable to make tablets, lozenges and suppositories of various sizes; wherein the press is comprised of a minimum number of simple parts; wherein the press is easy to operate, economical to manufacture, and employable also as a measuring device.

A further object of the invention resides in the provision of a press which is portable, whose parts are adjustable and which is light in weight.

These objects and other incidental ends and advantages of the invention will hereinafter appear in the progress of the disclosure and as pointed out in the appended claims.

Accompanying this specification is a drawing showing a preferred form of the invention wherein corresponding reference characters designate corresponding parts throughout the several views and wherein:

Figure 1 is a front view in elevation of the press part being shown in section.

Figure 2 is a front view in elevation partly in section showing a compression block with which the press cooperates.

Figure 3 is a vertical, sectional view of Figure 1.

Figure 4 is a view similar to Figure 3 showing the press adjusted to an elongated position.

Figure 5 is similar to Figure 2 of the compression block partly in section showing a suppository mold therein.

In accordance with the invention and in accordance with the preferred form thereof shown in the drawing, the press comprises a plunger shaft 10 having a pounding member 11 at the bottom thereof, the said shaft having its upper portion threaded. A tube 13 is adapted to be in slidable engagement with shaft 10, the pounding member 11 serving as a lower stop therefor.

A springably returnable depressing member 14 is adapted to be slidably engageable with the upper portion of tube 13, the said member having a top head 15 provided with a central and internally threaded orifice for engagement with the threaded portion 12 of the plunger shaft. A lock nut 16 is provided for head 15, while a coiled compression spring 17, adapted to make the depressing member 14 is returnable after hand pressure is applied to lock nut 16, lies between the outer surface of shaft portion 13 and the inner surface of the depressing member 14, the said spring 17 being held at the upper and lower limits between the undersurface of head 15 and the upper edge of tube 13.

A slidably engageable barrel member is adapted to be adjustably affixed to the tube 13 by means of a set screw 19 mounted on circular flange 20. Shaft tube 13 may be provided with calibrations 21 whereby the volume of a receptacle 22 formed between the undersurface of pounding member 11 and the inner walls of barrel 22 near the bottom is adjustable. Thus, by loosening set screw 19 and moving barrel 18 to an upper position along tube 13, receptacle 22 becomes smaller in volume. By moving barrel 18 to a lower position along tube 13 as is shown in Figure 4, the volume is increased as indicated by numeral 23.

The pounding member 11 is forced downwardly within barrel 18 by applying hand pressure to the springably returnable depressing member 14, the latter having the upper end of barrel 18 to serve as a stop for the lower limit of the said depressing member. A compression block 25 is provided with a tablet or lozenge mold 26 on one side and a suppository mold 27 on the other side, the said molds cooperating with and engaging the lower portion of barrel 18.

The press as described is suitable for the formation of tablets, suppositories, lozenges and is also employable as a measuring device.

In the formation of tablets, the material therefor is contained in a suitable container, the material being moistened or dampened with a proper liquid mixture similar to that used in making tablet triturates. The graduations 21 are calibrated for specific weights of U. S. P. milk of sugar, when the latter is used as a vehicle. For any other substance the adjustment of the press is determined by weighing the tablet material, inserting the same in receptacle 22 while the press is inverted and while the set screw 19 is loose and compressing the stored material in receptacle 22 by compressing it lightly in block 25. After such compression, the set screw 19 is tightened. In this fashion, the receptacle 22 is adjusted so that the operator in preparing to make up tablets of the aforementioned weight, merely dips the press firmly into the tablet substance, removes the press therefrom and places it into mold 25. A knock with the palm of the hand on lock nut 16 compresses the tablet against the bottom surface of mold 26, the formed tablet remaining within the lower part of the barrel below pounding member 11. The tablet is then pushed out by means of compression of plunger 10 after the block 25 has been removed from the press.

For the formation of suppositories, the same method of procedure is adopted except that the plunger shaft 10 is elongated relative to head 15. In order to elongate shaft 10, the lock nut 16 is removed as well as barrel member 18. The pounding member 11 is grasped by the finger and rotated about head 15, whereby the shaft 10 becomes elongated. Such adjustable elongation or shortening of shaft 10 controls the distance which pounding member 11 projects from the lower edge of barrel 18 when the depressing member 14 is at its lower limit. The pressing member engages with suppository mold 27 instead of tablet mold 26 for the formation of suppositories.

In the formation of lozenges, the same construction is used as for the formation of tablets except that all the parts are enlarged.

Where it is desired to use the press as a measuring cup, the operator inverts the press and loosens set screw 19 so that barrel 18 is slidable along the shaft tube 13. The barrel 18 is raised above the pounder 11 while pouring powder in the receptacle formed thereby. Thereafter, block 25 is placed over the end of barrel 18 and the said barrel is released until it comes to a stop. At this point, the set screw 19 is tightened. In this fashion, the press is used as a measuring device by merely dipping the implement into the powder to be dispensed with a firm and even pressure. Thereafter, the powder is forced out into narrow containers or any desired receptacles by depressing plunger shaft 10.

I wish it understood that minor changes and variations in the integration, material, location and movability of the parts, may all be resorted to without departing from the spirit of the invention and without departing from the scope of the appended claims.

I claim:

1. A tablet, lozenge and suppository press comprising a compression block having a mold therein, a plunger having a pounding member at the end thereof, a tube slidably engaging said plunger above the pounding member, a springably returnable depressing member for the plunger secured to the said plunger and being in slidable engagement with the upper end of said tube, a barrel member adjustably secured to the tubular member and forming a receptacle at the bottom thereof with the pounding member, the top of the barrel member serving as a stop for the depressing member, the lower end of the barrel member being adapted to engage the mold of the compression block whereby on forcing the plunger downwardly, compression in part at least of the tablet, lozenge and suppository material takes place within the barrel below the lower surface of the pounding member.

2. A tablet, lozenge and suppository press comprising a compression block having a mold therein, a body member, a plunger having a pounding member at the end thereof, the said plunger above the pounding member being in slidable engagement within said body member and contacting substantially the entire interior surface thereof, springably returnable means secured to the plunger for depressing the latter, a barrel member adjustably secured to the body member and forming a receptacle at the bottom thereof with the pounding member, said receptable being capable of having its length, but not its diameter, varied the lower end of the barrel member being adapted to engage the mold of the compression block whereby on forcing the plunger downwardly, compression in part at least of the tablet, lozenge and suppository material takes place within the barrel below the lower surface of the pounding member.

3. A tablet, lozenge and suppository press comprising a compression block having a mold therein, a body member, a movable pounding member in slidable engagement within said body member and contacting substantially the entire interior surface thereof, springably returnable means secured to the pounding member for depressing the latter, a barrel member adjustably secured to the body member and forming with the pounding member, a receptable of variable size as to its vertical height but being of the same diameter throughout its length, the lower end of the barrel member being adapted to engage the mold of the compression block whereby on forcing the pounding member downwardly compression in part at least of the tablet, lozenge and suppository material takes place within the barrel below the lower surface of the pounding member.

4. In a tablet, lozenge and suppository press, a body member, a movable pounding member in slidable engagement within said body member and contacting substantially the entire interior surface thereof, springably returnable means secured to the pounding member for depressing the latter, a barrel member adjustably secured to the body member and forming with the pounding member, a receptacle of variable size as to its vertical height but being of the same diameter throughout its length.

5. A tablet, lozenge, and suppository press mechanism adapted for cooperation with a compression block having a mold therein, said press mechanism comprising a plunger having a pounding member at the end thereof, a tube slidably engaging said plunger above the pounding member, a springably returnable depressing member for the plunger secured to the plunger and being in slidable engagement with the upper end of said tube, a barrel member adjustably secured to the tubular member and forming a receptacle at the bottom thereof with the pounding member, the top of the barrel member serving as a stop for the depressing member, the lower end of the barrel member being adapted for engagement with the mold of the compression block, whereby, on forcing the plunger downwardly, compression of the tablet, lozenge, and suppository material takes place between the lower surface of the pounding member and the lower part of the cavity of the compression block.

6. A tablet, lozenge, and suppository press mechanism adapted for cooperation with a compression block having a mold therein, said press mechanism comprising a body member, a movable pounding member in slidable engagement within said body member and contacting substantially the entire interior surface thereof, springably returnablemeans secured to the pounding member for depressing the latter, a barrel member adjustably secured to the body member and forming with the pounding member, a receptable of variable size as to its vertical height but being of the same diameter throughout its length, the lower end of the barrel member being adapted to engage the mold of the compression block, whereby, on forcing the pounding member downwardly, compression of the tablet, lozenge, and suppository material takes place between the lower surface of the pounding member and the lower part of the cavity of the compression block.

JONAS LANGERMAN.